(12) United States Patent
Antic (10) Patent No.: US 11,847,559 B2
(45) Date of Patent: Dec. 19, 2023

(54) MODIFYING DATA CLEANSING TECHNIQUES FOR TRAINING AND VALIDATING AN ARTIFICIAL NEURAL NETWORK MODEL

(71) Applicant: HCL AMERICA, INC., Boca Raton, FL (US)

(72) Inventor: Stevan Antic, Boca Raton, FL (US)

(73) Assignee: HCL AMERICA, INC., Boca Raton, FL (US)

( * ) Notice: Subject to any disclaimer, the term of this patent is extended or adjusted under 35 U.S.C. 154(b) by 567 days.

(21) Appl. No.: 16/809,198

(22) Filed: Mar. 4, 2020

(65) Prior Publication Data

US 2021/0279564 A1  Sep. 9, 2021

(51) Int. Cl.
*G06N 3/08* (2023.01)
*G06N 20/00* (2019.01)
*G06F 18/21* (2023.01)

(52) U.S. Cl.
CPC ............ *G06N 3/08* (2013.01); *G06F 18/217* (2023.01); *G06N 20/00* (2019.01)

(58) Field of Classification Search
None
See application file for complete search history.

(56) References Cited

U.S. PATENT DOCUMENTS

| 6,529,809 B1 | 3/2003 | Breed et al. | |
| 8,374,974 B2 * | 2/2013 | Chen | G06K 9/6298 706/8 |
| 10,853,385 B1 * | 12/2020 | Truong | G06F 16/1794 |
| 2019/0147371 A1 * | 5/2019 | Deo | G06N 20/20 706/12 |
| 2020/0076841 A1 * | 3/2020 | Hajimirsadeghi | G06N 3/0454 |
| 2021/0056412 A1 * | 2/2021 | Jung | G06N 3/045 |

FOREIGN PATENT DOCUMENTS

WO  2019067960 A1  4/2019

OTHER PUBLICATIONS

Comerford et al., "Revealing prediction uncertainty in artificial neural network based reconstruction of missing data in stochastic process records utilizing extreme learning machines," 2017 IEEE Symposium Series on Computational Intelligence (SSCI), 2017, pp. 1-7, (Year: 2017).*
Workload Automation Community, "Testing HCL Workload Automation Web UI Using HCL Onetest UI"; Dec. 20, 2018 (Year: 2018).*

(Continued)

*Primary Examiner* — Chesiree A Walton (57) ABSTRACT

Disclosed is a method and system for modifying data cleansing techniques for training and validating an Artificial Neural Network (ANN) model. The method comprises normalizing and validating data of different formats, obtained from different sources. The ANN model is trained using the normalized and validated data. Alternatively, the ANN model could be trained using data of a common format obtained from a deterministic data model. The trained ANN model is used to generate ANN stochastic data. Data validation component from the deterministic data model is reused for the normalizing and the validating of the data, for validating the ANN stochastic data.

11 Claims, 4 Drawing Sheets

(56) References Cited

OTHER PUBLICATIONS

Sharma, et al., "Automated Parsing of Geographical Addresses: A Multilayer Feedforward Neural Network Based Approach," 2018 IEEE 12th International Conference on Semantic Computing (ICSC), 2018, pp. 123-130 (Year: 2018).*

Liu et al., "Machine learning classifiers using stochastic logic," 2016 IEEE 34th International Conference on Computer Design (ICCD), Scottsdale, AZ, USA, 2016, pp. 408-411, doi: 10.1109/ICCD.2016.7753315. (Year: 2016).*

Optimal Deep Learning LSTM Model for Electric Load Forecasting using Feature Selection and Genetic Algorithm: Comparison with Machine Learning Approaches—Salah Bouktif, et al.—Jun. 22, 2018.

\* cited by examiner

MODIFYING DATA CLEANSING TECHNIQUES FOR TRAINING AND VALIDATING AN ARTIFICIAL NEURAL NETWORK MODEL

TECHNICAL FIELD

The present subject matter described herein, in general, relates to Artificial Neural Networks, and more particularly to modifying data cleansing techniques for training and validating an Artificial Neural Network model.

BACKGROUND

Data processing techniques are used to generate test data, such as One Test Data. Such test data is generated intelligently based on the previous data, using Artificial Neural Networks (ANN). In such scenarios, the test data is stochastic in nature i.e. the data has a random probability distribution or pattern that could be analysed statistically but may not be predicted precisely. Therefore, such test data may require parsing to clean the test data from bad data. Parsing generally involves breaking data blocks of the test data into smaller chunks by following a set of rules, so that the test data could be interpreted easily.

Building data cleansing solution for ANN generated data requires data modelling to match cleansing requirements and the ANN stochastically generated data. Deterministic data validation works for algorithmic generated deterministic data, and generally does not work for non-algorithmic stochastic data generated by the ANN. Further, manual human validation of data is time consuming and is also prone to errors. Therefore, there is a need of a system and a method for modifying data cleansing techniques for training and validating an Artificial Neural Network (ANN) model

SUMMARY

Before the present systems and methods for modifying data cleansing techniques for training and validating an Artificial Neural Network (ANN) model, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application.

This summary is provided to introduce aspects related to a system and a method for modifying data cleansing techniques for training and validating an ANN model. This summary is not intended to identify essential features of the claimed subject matter nor is it intended for use in determining or limiting the scope of the claimed subject matter.

In one implementation, a system for modifying data cleansing techniques for training and validating an ANN model is disclosed. In one aspect, the system comprises a memory and a processor coupled to the memory. Further, the processor may be capable of executing instructions in the memory to perform one or more steps. In the aspect, the system may comprise a memory and a processor coupled to the memory. The processor is capable of executing instructions to perform several steps described now. The processor may normalize and validate data collected in different formats from different data sources. Specifically, the data present in different formats may be normalized to a common format by mapping the different data sources to a common data source. The normalized data may then be parsed. Successively, format validation and restriction validation may be performed on the parsed data. Parsing operation may be restarted upon occurrence of an error till data of a required format is obtained.

The ANN model may be trained using the normalized and validated data. Alternatively, a deterministic data model such as OneTest Data may be used to obtain the data of a common format, and the ANN model may be trained upon such data. ANN stochastic data may be generated using the trained ANN model. Data validation component of the deterministic data model, used for the normalizing and the validating of the data, may be used for validating the ANN stochastic data.

In one implementation, a method for modifying data cleansing techniques for training and validating an ANN model is disclosed. In one aspect, the method may comprise normalizing and validating data collected in different formats from different data sources. Specifically, the data present in different formats may be normalized to a common format by mapping the different data sources to a common data source. The normalized data may then be parsed. Successively, format validation and restriction validation may be performed on the parsed data. Parsing operation may be restarted upon occurrence of an error till data of a required format is obtained.

The ANN model may be trained using the normalized and validated data. Alternatively, a deterministic data model such as OneTest Data may be used to obtain the data of a common format, and the ANN model may be trained upon such data. ANN stochastic data may be generated using the trained ANN model. Data validation component of the deterministic data model, used for the normalizing and the validating of the data, may be used for validating the ANN stochastic data.

In yet another implementation, non-transitory computer readable medium embodying a program executable in a computing device for modifying data cleansing techniques for training and validating an ANN model is disclosed. In one aspect, the program may comprise a program code for normalizing and validating data collected in different formats from different data sources. Specifically, the data present in different formats may be normalized to a common format by mapping the different data sources to a common data source. The program may further comprise a program code for parsing the normalized data. The program may further comprise a program code for performing format validation and restriction validation on the parsed data. The program may further comprise a program code for restarting parsing operation upon occurrence of an error till data of a required format is obtained.

The program may further comprise a program code for training the ANN model using the normalized and validated data. Alternatively or additionally, program code may be present for using a deterministic data model such as OneTest Data for obtaining the data of a common format and training the ANN model upon such data. The program may further comprise a program code for generating ANN stochastic data using the trained ANN model. The program may further comprise a program code for using a data validation component of the deterministic data model, used for the normalizing and the validating of the data, for validating the ANN stochastic data.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for modifying data cleansing techniques for training and validating an Artificial Neural Network (ANN) model, similar or equivalent to those described herein can be used in the practice or testing of embodiments of the present disclosure, the exemplary, systems and methods for modifying data cleansing techniques for training and validating an ANN model are now described. The disclosed embodiments for modifying data cleansing techniques for training and validating an ANN model are merely examples of the disclosure, which may be embodied in various forms.

Various modifications to the embodiment will be readily apparent to those skilled in the art and the generic principles herein may be applied to other embodiments for modifying data cleansing techniques for training and validating an ANN model. However, one of ordinary skill in the art will readily recognize that the present disclosure for modifying data cleansing techniques for training and validating an ANN model is not intended to be limited to the embodiments described, but is to be accorded the widest scope consistent with the principles and features described herein.

Figure 1:
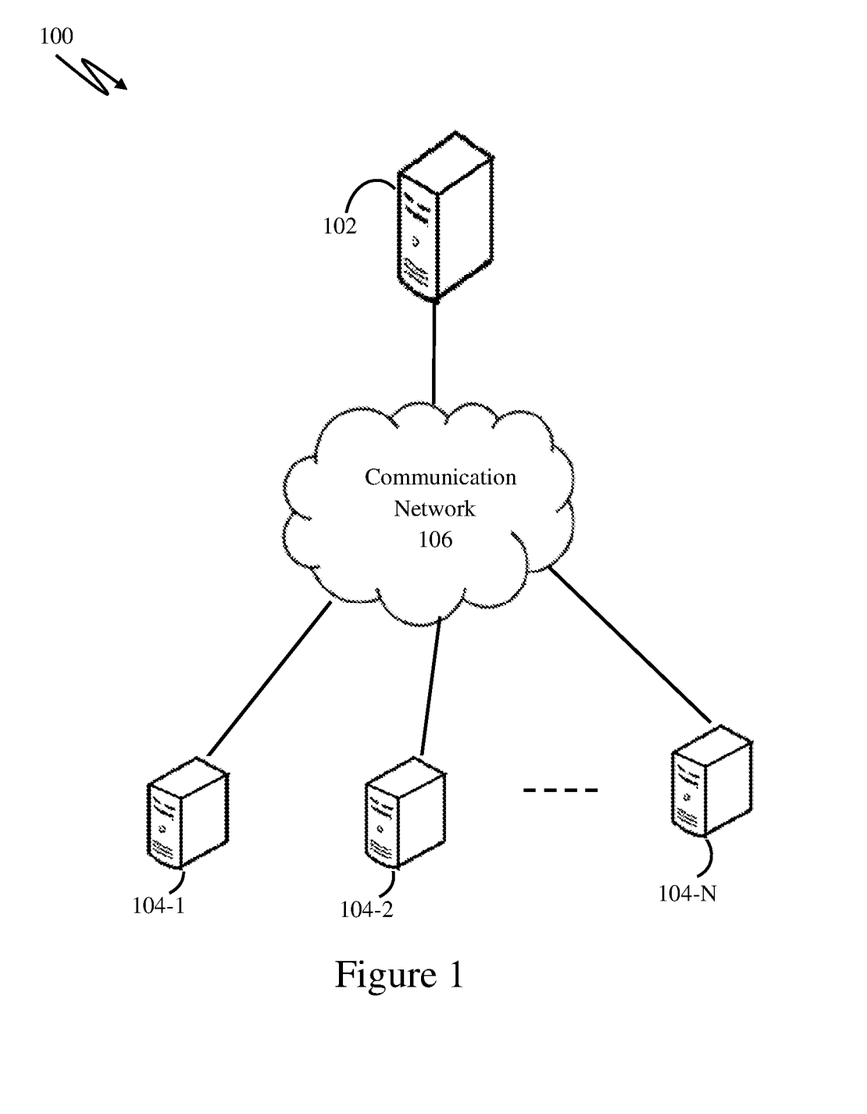
FIG. 1 illustrates a network architecture diagram 100 of a system 102 for modifying data cleansing techniques for training and validating an Artificial Neural Network (ANN) model, in accordance with an embodiment of the present subject matter.

Referring now to FIG. 1, a network implementation diagram 100 of a system 102 for modifying data cleansing techniques for training and validating an Artificial Neural Network (ANN) model, in accordance with an embodiment of the present subject matter may be described. In one example, the system 102 may be connected with data sources 104-1 through 104-N (collectively referred as 104) through a communication network 106.

It should be understood that the system 102 and the data sources 104 correspond to computing devices. It may be understood that the system 102 and the data sources 104 may also be implemented in a variety of computing systems, such as a laptop computer, a desktop computer, a notebook, a workstation, a mainframe computer, a server, a network server, a cloud-based computing environment, or a mobile and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like. The communication network 106 may be organized as a peer to peer (P2P) network, where the system 102 and the data sources 104 represent peer nodes with equivalent roles in the network.

Figure 2:
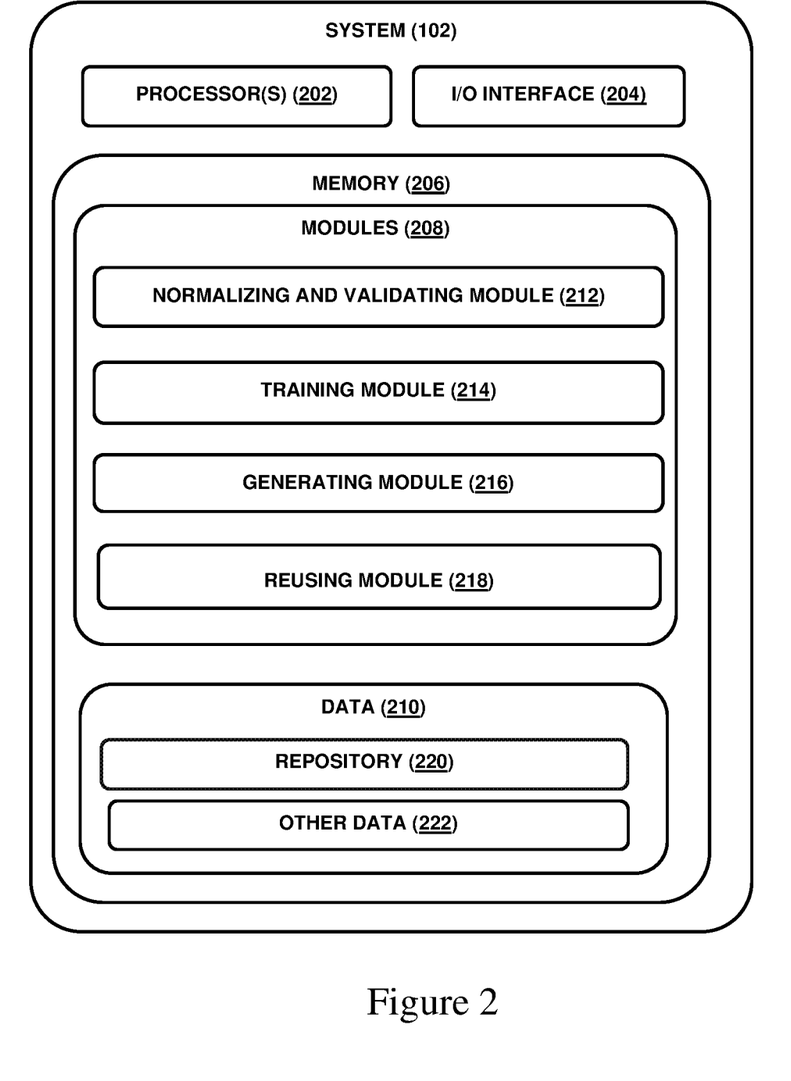
FIG. 2 illustrates a block level diagram of the system 102, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the data sources 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. In one implementation, the memory 206 may include data 210. The modules 208 include routines, programs, objects, components, data structures, etc., which perform particular tasks or implement particular abstract data types. In one implementation, the modules 208 may include a normalizing and validating module 212, a training module 214, a generating module 216, and a reusing module 218. The modules 208 described herein may be implemented as software modules that may be executed in the cloud-based computing environment of the system 102.

The data 210 may include a repository 220 for storing data processed, computed, received, and generated by one or more of the modules 208. Furthermore, the data 210 may include other data 222 for storing data generated as a result of the execution of modules than the ones mentioned above.

In one implementation, to modify existing data cleansing techniques for training and validating an Artificial Neural Network (ANN) model, at first, data may be obtained from one or more data sources. The data may be present in a single format or different formats. While the data is present in different formats, the data may be normalized and validated by the normalizing and validating module 212. In order to normalize and validate the data, the data present in different data formats may be to a common format by mapping the different data sources to a common data source. The normalized data may then be parsed using a suitable parsing technique. Format validation and restriction validation may be performed on the parsed data to determine presence of the data in a common suitable format. Parsing operation may be restarted upon occurrence of an error till data of a required format is obtained.

In an alternate embodiment, instead of obtaining the data present in different formats and processing such data to obtain data in a common format, a deterministic data model may be utilized for generating data of a common format. OneTest Data is one such deterministic data model that could be used for generating data of a common format. Such common format may be selected amongst a range of available formats, such as (Comma-Separated Values) CSV, JavaScript Object Notation (JSON), and Extensible Markup Language (XML). Further, a custom format may be defined by a user, and the data may be obtained in such custom format.

After the data of a common format is obtained, the ANN model may be trained using the data by the training module 214. Upon such training, a trained ANN model may be obtained. The ANN may be implemented using one of Recurrent Neural Network (RNN) classes i.e. a Long Short-Term Memory (LSTM) and a Gated Recurrent Unit (GRU). Alternatively, the ANN may be implemented based on Restricted Boltzmann Machines (RBM) and a Deep Belief Net (DBN).

The trained ANN model may be used for generating ANN stochastic data by the generating module 216. A data validation component of a deterministic data model used for normalizing and validating of the data may be used by the reusing module 218 for validating the ANN stochastic data.

Figure 3:
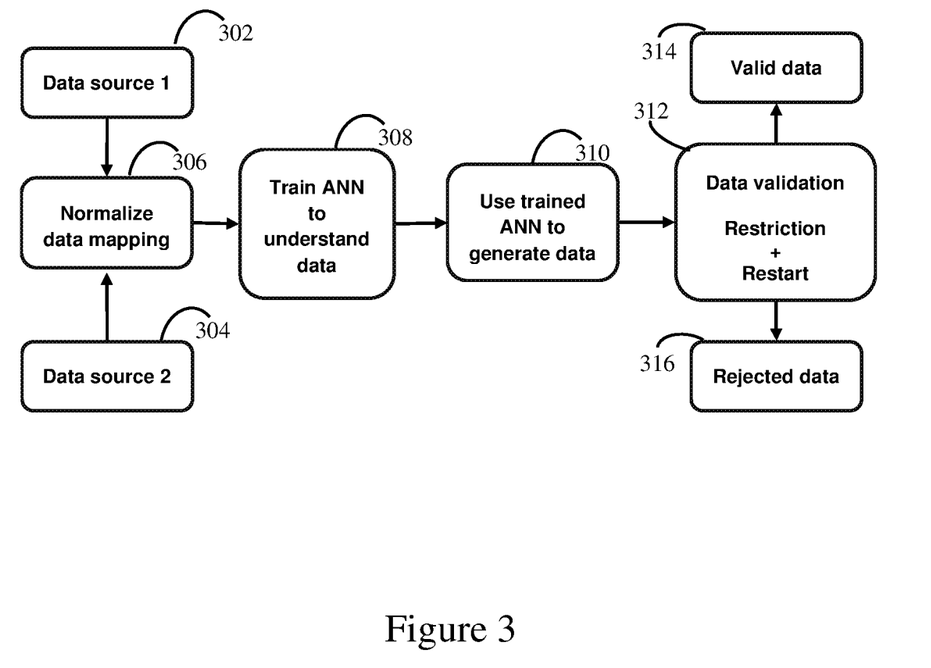
FIG. 3 illustrates an exemplary process flow for modifying data cleansing techniques for training and validating an Artificial Neural Network (ANN) model, in accordance with an embodiment of the present subject matter.

In one implementation, referring to FIG. 3 illustrating an exemplary process flow for modifying data cleansing techniques for training and validating an Artificial Neural Network (ANN) model, a practical implementation of the proposed method is described.

At first, data was obtained from two different data sources, namely data source 1 at block 302 and data source 2 at block 304. In one scenario, data source 1 included address of different users staying in New York city. Further, the data source 1 was present as a CSV format and included 500 thousand records. Further, the data source 2 included address of different users staying in Palm Beach FL state. Further, the data source 2 was present as a CSV format and included 500 thousand records.

Such data obtained from the data source 1 and the data source 2 was normalized to obtain a total data set in a common format, at block 306. The total data set was provided to an ANN model to allow the ANN model to understand the total data set, at block 308. Thereupon, the trained ANN model was used to generate ANN stochastic data, at block 310.

Format validation and restriction validation were performed on the ANN stochastic data, at block 312. Further, the validation operations were restarted upon occurrence of an error till data of a required format was obtained. Restrictions used during the restriction validation included instructions for identifying allowed data. For example, state must be FL or NY, must be a letter, and must be combination of letters and numbers, ZIP code has to be the 5 digit integer number starting with 3. Further, the allowed data must satisfy plurality of different parsing rules defined internally or externally via lookups. Instructions for identifying disallowed data included that it cannot be a number, cannot be a letter, and should be standard defined types i.e. must be a float number, date, time, or must be a custom type.

Finally, upon successful validations, valid data was obtained at block 314 and rejected data was obtained at block 316. The valid data included addresses that matched with normalized type trees. The rejected data included addresses that did not match with the normalized type trees.

Below provided is a sample of the data obtained from the above implementation, where rejected generated addresses are marked with Bad prefix, where a bad record has 7 fields instead of 8.

→FL,223,SPINTO,BLVD,"S",WEST PALM BEACH, 33411,4412
Ok→NY,20-04,37 ST,,,NY,11105,
Ok→FL,43543,HOVE PORK,ST,,,WEST PALM BEACH, 33415,4483
Ok→NY,1378,MIDDEN ST,,,NY,11236,
Bad→FL,4248,FORESETTREST, N,,WESTINA,
Ok→NY,90-31,40 AVE,,,NY,11364,
Ok→FL,4340,OLD ISLAND,PL,,PALM BEACH GARDENS,33410,4409
Ok→NY,83-18,102 ST,,,NY,11417,
Ok→FL,233,RICHMINT,DR,,PALM SPRINGS,33461, 2920
Ok→NY,2106,22 ST,,,NY,11215,

Therefore, above described embodiments provide for reusing existing data cleansing techniques and models for validation with restrictions and restart of Artificial Intelligence stochastically generated data.

Figure 4:
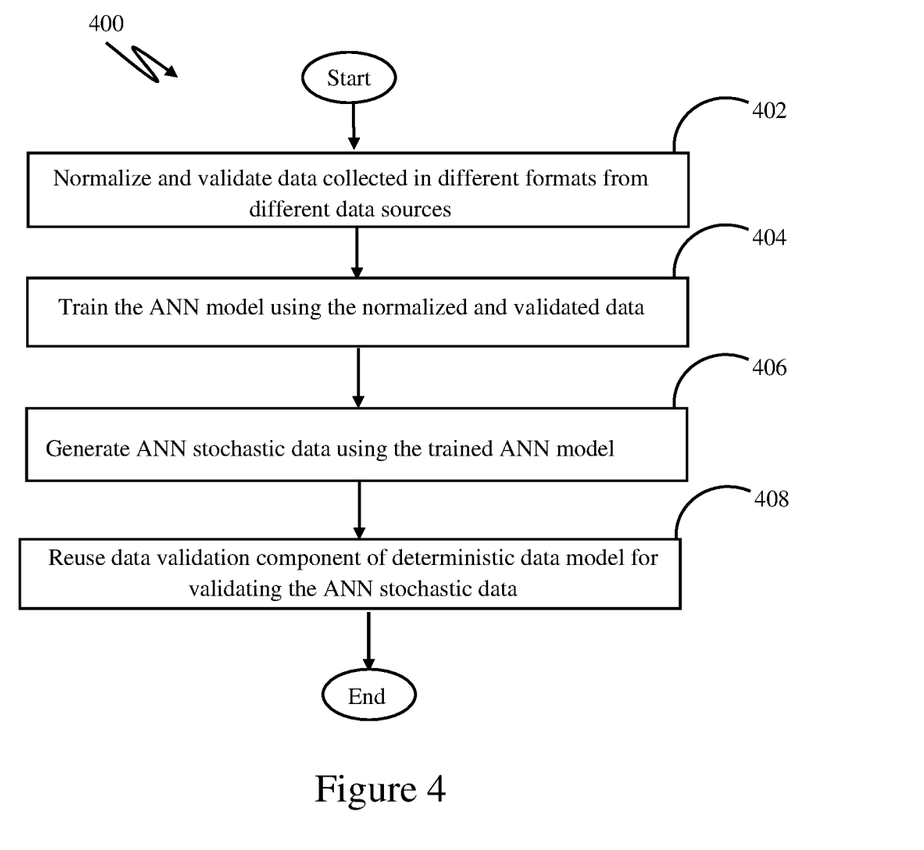
FIG. 4 illustrates a method 400 for modifying data cleansing techniques for training and validating an Artificial Neural Network (ANN) model, in accordance with an embodiment of the present subject matter.

Referring now to FIG. 4, a method 400 for modifying data cleansing techniques for training and validating an Artificial Neural Network (ANN) model is described, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types.

The order in which the method 400 for modifying data cleansing techniques for training and validating an Artificial Neural Network (ANN) model is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, data obtained from different data sources may be normalized and validated.

At block 404, the ANN model may be trained using the normalized and validated data.

At block 406, ANN stochastic data may be generated using the trained ANN model.

At block 408, data validation component of a deterministic data model used for the normalizing and the validating of the data may be reused for validating the ANN stochastic data.

Although implementations for methods and systems for modifying data cleansing techniques for training and validating an Artificial Neural Network (ANN) model have been described in language specific to structural features and/or methods, it is to be understood that the appended claims are not necessarily limited to the specific features or methods described. Rather, the specific features and methods are disclosed as examples of implementations for modifying data cleansing techniques for training and validating an Artificial Neural Network (ANN) model.

The invention claimed is:

1. A method for modifying data cleansing techniques for training and validating an Artificial Neural Network (ANN) model, the method comprising:
   normalizing and validating data collected in different formats from different data sources, wherein normalizing and validating data comprises:
      normalizing the data present in different formats to a common format by mapping the different data sources to a common data source;
      parsing the normalized data;
      performing format validation and restriction validation on the parsed data; and
      restarting parsing upon occurrence of an error till data of a required format is obtained;
   training the ANN model using the normalized and validated data;
   generating ANN stochastic data using the trained ANN model; and
   reusing data validation component of a deterministic data model, for validating the ANN stochastic data, wherein reusing the data validation component comprises:
      performing format validation and restriction validation on the ANN stochastic data,
         wherein the format validation is restarted upon occurrence of an error till the ANN stochastic data of a required format is obtained,
         wherein the restriction validation comprises instructions for identifying allowed data and disallowed data, and
         wherein the allowed data and the disallowed data satisfy a plurality of pre-defined parsing rules; and
      generating valid data and rejected data upon successful format validation and restriction validation, wherein the valid data matches with normalized type trees and the rejected data mismatches with the normalized type trees.

2. The method as claimed in claim 1, further comprising utilizing a deterministic data model for generating data of a common format.

3. The method as claimed in claim 2, wherein OneTest Data is used as the deterministic data model to generate the data of a common format.

4. The method as claimed in claim 3, wherein the common format is one of (Comma-Separated Values) CSV, JavaScript Object Notation (JSON), and Extensible Markup Language (XML).

5. The method as claimed in claim 1, wherein the ANN is implemented using one of Recurrent Neural Network (RNN) classes comprising a Long Short-Term Memory (LSTM) and a Gated Recurrent Unit (GRU), Restricted Boltzmann Machines (RBM), and a Deep Belief Net (DBN).

6. A system for modifying data cleansing techniques for training and validating an Artificial Neural Network (ANN) model, the system comprising:
   a memory; and
   a processor coupled to the memory, wherein the processor is capable of executing instructions to perform steps of:
      normalizing and validating data collected in different formats from different data sources, wherein normalizing and validating data comprises:
         normalizing the data present in different formats to a common format by mapping the different data sources to a common data source;
         parsing the normalized data;
         performing format validation and restriction validation on the parsed data; and
         restarting parsing upon occurrence of an error till data of a required format is obtained;
      training the ANN model using the normalized and validated data;
      generating ANN stochastic data using the trained ANN model; and
      reusing data validation component of a deterministic data model, for validating the ANN stochastic data, wherein reusing the data validation component comprises:
         performing format validation and restriction validation on the ANN stochastic data,
            wherein the format validation is restarted upon occurrence of an error till the ANN stochastic data of a required format is obtained,
            wherein the restriction validation comprises instructions for identifying allowed data and disallowed data, and
            wherein the allowed data and the disallowed data satisfy a plurality of pre-defined parsing rules; and
         generating valid data and rejected data upon successful format validation and restriction validation, wherein the valid data matches with normalized type trees and the rejected data mismatches with the normalized type trees.

7. The system as claimed in claim 6, further comprising utilizing a deterministic data model for generating data of a common format.

8. The system as claimed in claim 7, wherein OneTest Data is used as the deterministic data model to generate the data of a common format.

9. The system as claimed in claim 8, wherein the common format is one of (Comma-Separated Values) CSV, JavaScript Object Notation (JSON), and Extensible Markup Language (XML).

10. The system as claimed in claim 6, wherein the ANN is implemented using one of Recurrent Neural Network (RNN) classes comprising a Long Short-Term Memory (LSTM) and a Gated Recurrent Unit (GRU), Restricted Boltzmann Machines (RBM), and a Deep Belief Net (DBN).

11. A non-transitory computer program product having embodied thereon a computer program for modifying data cleansing techniques for training and validating an Artificial Neural Network (ANN) model, the computer program product storing instructions for:

normalizing and validating data collected in different formats from different data sources, wherein normalizing and validating data comprises:
    normalizing the data present in different formats to a common format by mapping the different data sources to a common data source;
    parsing the normalized data;
    performing format validation and restriction validation on the parsed data; and
    restarting parsing upon occurrence of an error till data of a required format is obtained;
  training the ANN model using the normalized and validated data;
  generating ANN stochastic data using the trained ANN model; and
  reusing data validation component of a deterministic data model, for validating the ANN stochastic data, wherein reusing the data validation component comprises:
    performing format validation and restriction validation on the ANN stochastic data,
      wherein the format validation is restarted upon occurrence of an error till the ANN stochastic data of a required format is obtained,
      wherein the restriction validation comprises instructions for identifying allowed data and disallowed data, and
      wherein the allowed data and the disallowed data satisfy a plurality of pre-defined parsing rules; and
    generating valid data and rejected data upon successful format validation and restriction validation, wherein the valid data matches with normalized type trees and the rejected data mismatches with the normalized type trees.

* * * * *